United States Patent [19]
Rouse

[11] 3,800,803
[45] Apr. 2, 1974

[54] COMBINE SIEVE SUPPORT
[75] Inventor: Paul L. Rouse, Moline, Ill.
[73] Assignee: International Harvester Company, Chicago, Ill.
[22] Filed: Feb. 8, 1973
[21] Appl. No.: 330,769

[52] U.S. Cl. ................................. 130/24, 209/398
[51] Int. Cl. ............................................. A01f 12/44
[58] Field of Search ........ 130/24, 26; 209/392, 397, 209/398, 399, 405, 408, 409, 412, 413, 414

[56] References Cited
FOREIGN PATENTS OR APPLICATIONS
492,588  5/1953  Canada ................................. 130/24
1,082,077  5/1960  Germany .............................. 130/24

Primary Examiner—Antonio F. Guida
Attorney, Agent, or Firm—F. David AuBuchon; Floyd B. Harman

[57] ABSTRACT

A chaffer sieve support for a combine harvester which facilitates sieve installation and removal and also confines the grain to the cleaning area of the sieve so that there will be no passage of grain laterally over the side frame members thereof. A pair of support angles embrace the side frame members of the chaffer sieve and are pivoted at their forward ends to the side rails of the grain pan for limited swinging movement between a raised clamped position wherein, in combination with a pair of lateral flanges on the grain pan side rails, they define sieve-receiving channels, and a lowered inclined position wherein they release the sieve and, in effect, provide a ramp on which the sieve may be slid rearwardly and downwardly for removal purposes. In the raised position of the support angles, the side frame members of the chaffer sieve are entirely confined within the chanels and thus only the effective cleaning area of the sieve is exposed to the grain for cleaning purposes.

10 Claims, 10 Drawing Figures

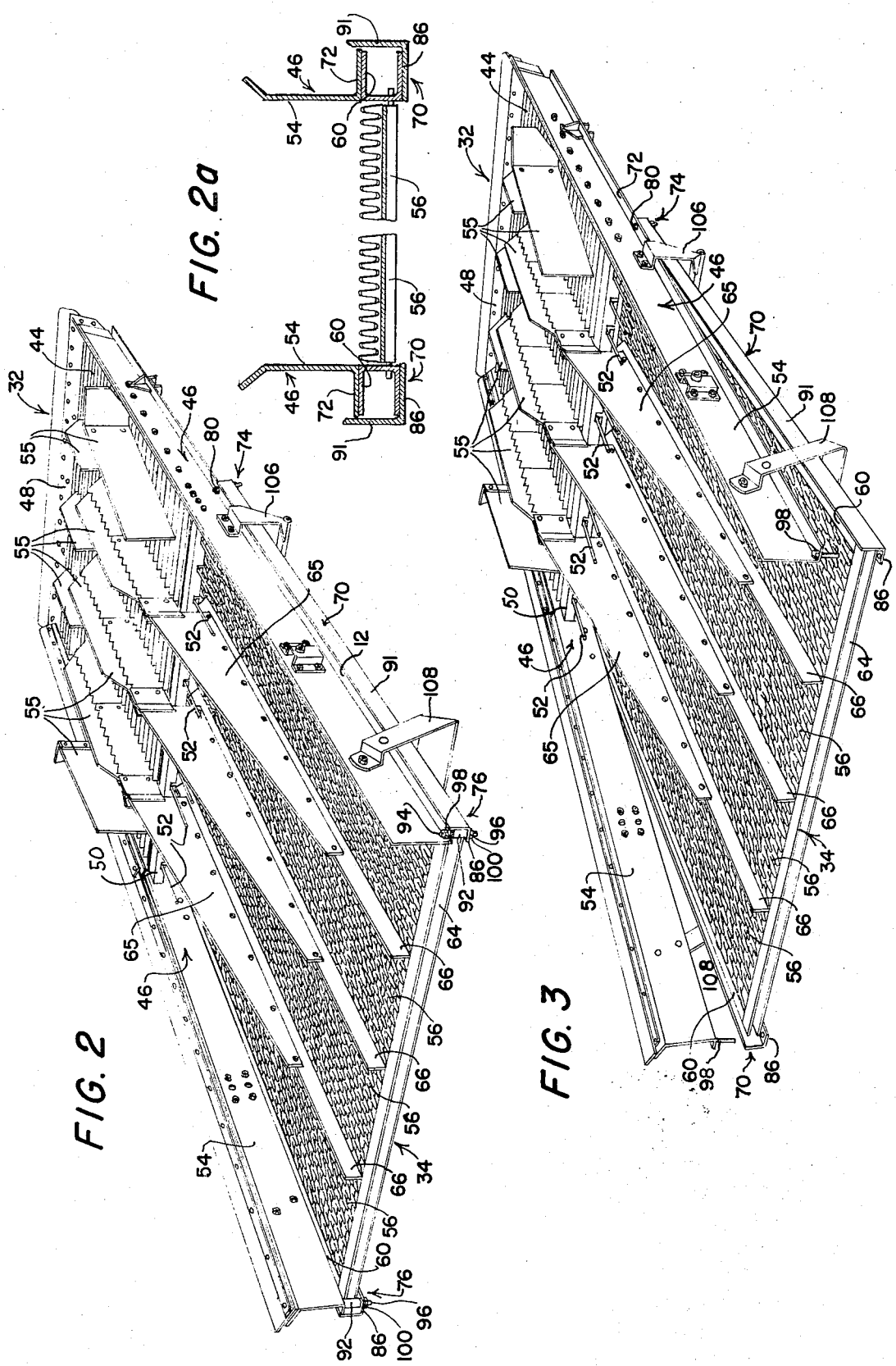

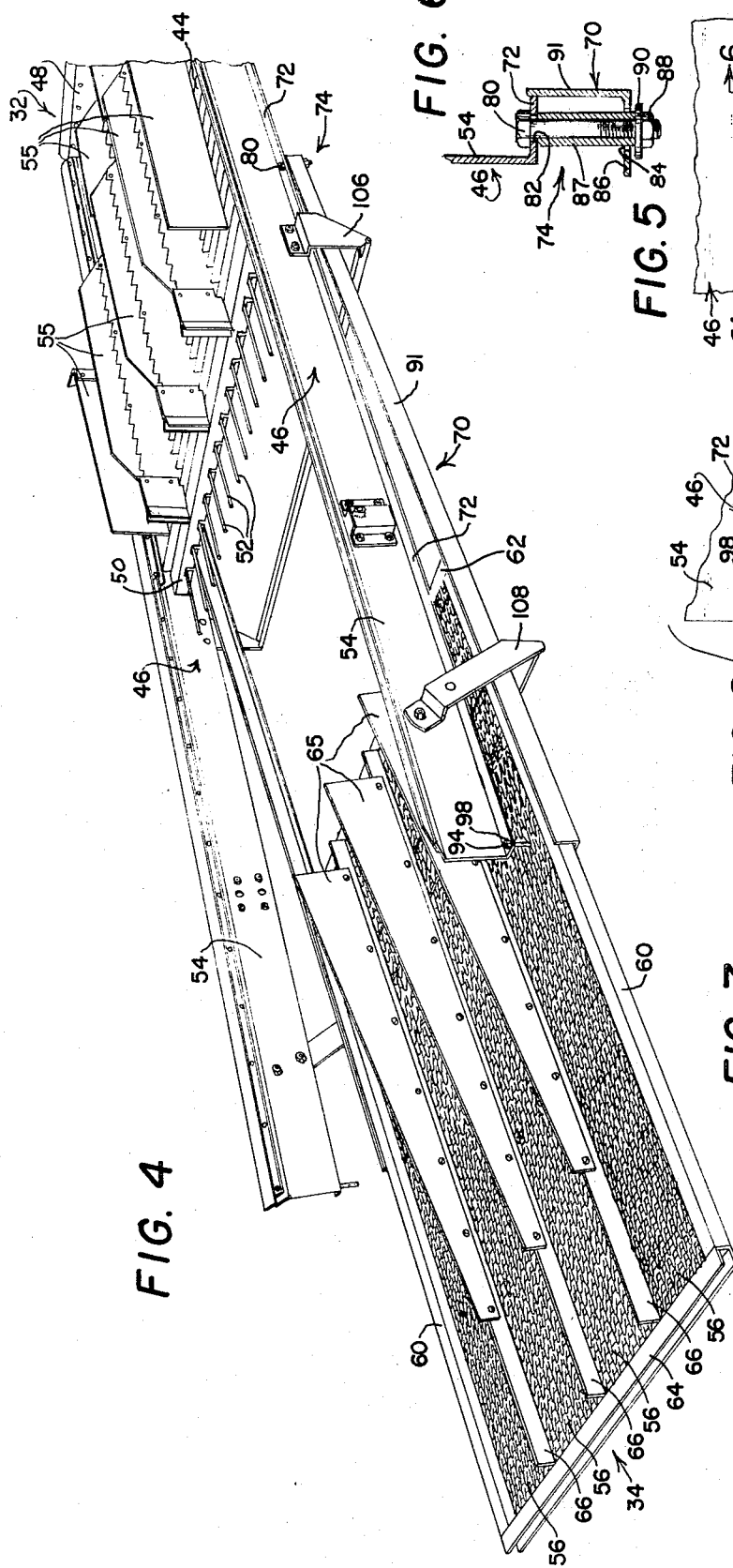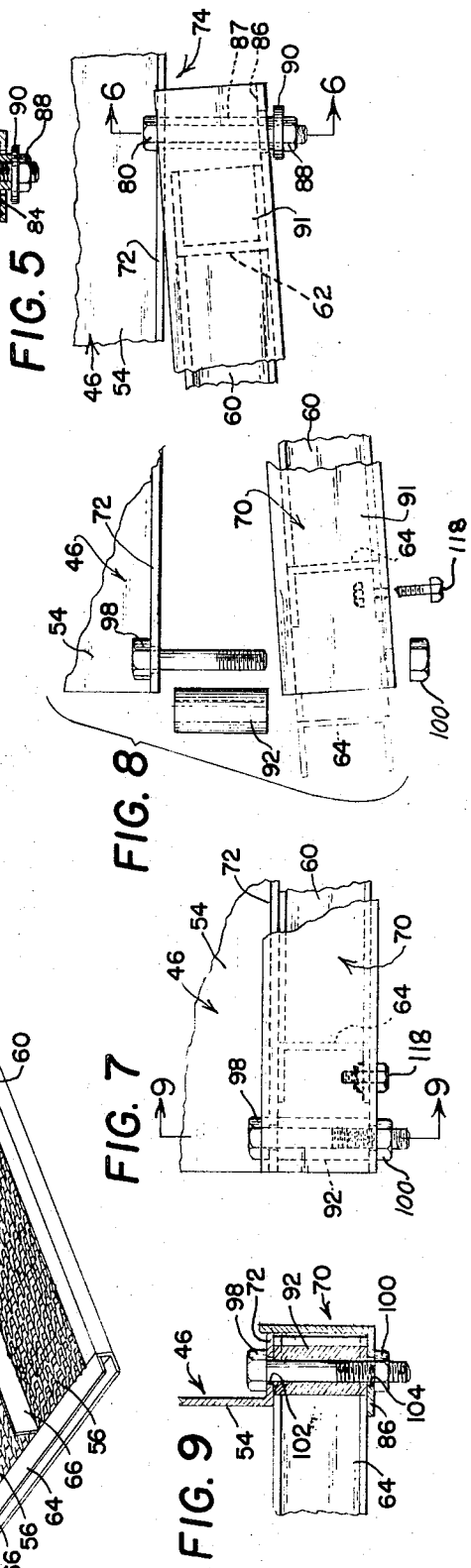

COMBINE SIEVE SUPPORT

SPECIFICATION

The present invention relates generally to harvesting machines of the type which is commonly referred to as a combine harvester and has particular reference to a novel support for the chaffer sieve which ordinarily constitutes a functional component of such a harvester.

In a combine harvester machine of the general type under consideration, the chaffer sieve is disposed in the cleaning area or zone of the machine where it functions to receive grain from a separating mechanism which is located thereabove and to remove any remaining chaff and other fines which may be associated therewith. The cleaning mechanism embodies a grain pan which receives thrashed material including some impurities such as straw which is discharged by the threshing drum for the purpose of separating out the clean grain. This thrashed material then falls by gravity to the chaffer sieve which ordinarily is supported between the side rails of the grain pan. Heretofore considerable difficulty has been encountered in efficiently cleaning the chaffer sieve due to the inaccessibility thereof. Due to lack of adequate space, efforts to clean the sieve in situ are not thorough and only partial or superficial cleaning thereof is possible. For complete cleaning of the sieve and especially for repair thereof, sieve removal must be resorted to. For the same reasons, chaffer sieve replacement has heretofore involved an appreciable amount of manual labor. During inclement weather, and especially at subfreezing temperatures chaffer sieve removal becomes increasingly difficult due to the fact that there is a tendency for the side edges or frame members of the chaffer sieve to become frozen to the side rails of the grain pan so that chaffer sieve removal in the field is virtually impossible.

The present invention is designed to overcome the above-noted limitations that are attendant upon the construction and operation of conventional combine harvester chaffer sieve supports and, toward this end, the invention contemplates the provision of a novel articulated supporting arrangement for the chaffer sieve wherein the latter, instead of being directly supported and confined between the side rails of the grain pan, is supported on and slidably carried by a pair of angle pieces which are coextensive with the side frame members of the chaffer sieve. Lateral flanges on the grain pan side rails cooperate with the angle pieces and, in combination with the latter, define a pair of inwardly facing channels within which the chaffer sieve side frame members are normally confined. Pivotal connections between the sieve-supporting angle pieces and the grain pan side rails enable the latter to swing downwardly thus, in effect, "opening up" the channels, releasing the chaffer sieve, and allowing the latter to be slid rearwardly and downwardly along the angle pieces for purposes of convenient sieve inspection or removal. Releasable clamping means are provided for maintaining the angle pieces in their raised channel-defining position wherein the sieve is locked in its operative position within the cleaning area, and a pair of underslung straps or hangers adjacent the front and rear ends of the angle pieces serve as supports to limit the extent of downward swinging movement or inclination of the angle pieces when the latter are in their position of sieve release. In such latter position, the angle pieces define a ramp along which the chaffer sieve may be slid to an intermediate supported position for purposes of sieve inspection, or to a fully released position for purposes of sieve removal from the machine. In the raised position of the angle pieces, the side frame members of the chaffer sieve are substantially completely encased by the aforementioned channels so that they are out of the path of movement of the grain with only the effective perforate area of the chaffer sieve being exposed to such grain. By such an arrangement, combine efficiency is improved in that there is no travel of grain along or across the imperforate side margins of the chaffer sieve and therefore there is no lateral loss of grain over such side margins.

The provision of a chaffer sieve support such as has briefly been outlined above, and possessing the stated advantages, constitutes the principal object of the present invention. Other objects and advantages of the invention, not at this time enumerated, will become readily apparent as the nature of the invention is better understood.

In the accompanying three sheets of drawing forming a part of this specification, one illustrative embodiment of the invention has been shown.

In these drawings:

FIG. 2 is an enlarged rear perspective view of a grain pan and chaffer sieve assembly with the improved chaffer sieve support operatively applied thereto and showing the chaffer sieve in its operative locked or clamped position on the grain pan side rails;

FIG. 2a is a sectional view taken along a vertical plane through FIG. 2;

FIG. 3 is a perspective view, similar to FIG. 2 but showing the chaffer sieve released from the grain pan side rails;

FIG. 4 is a perspective view, similar to FIG. 3, showing the chaffer sieve partially extended from the grain pan side rails to an intermediate position;

FIG. 5 is a further enlarged fragmentary detail side elevational view of a portion of the structure shown in FIG. 4, the view being taken in the vicinity of a hinge connection which is employed in practicing the present invention;

FIG. 6 is a sectional view taken substantially on the line 6—6 of FIG. 5;

FIG. 7 is an enlarged fragmentary detail side elevational view of another portion of the structure shown in FIG. 4, the view being taken in the vicinity of a sieve-locking or clamping structure which is employed in connection with the invention;

FIG. 8 is an exploded view of the structure shown in FIG. 7, this view representing the unlocked or released position of the chaffer sieve; and FIG. 9 is a sectional view taken substantially on the line 9—9 of FIG. 7.

Figure 1:
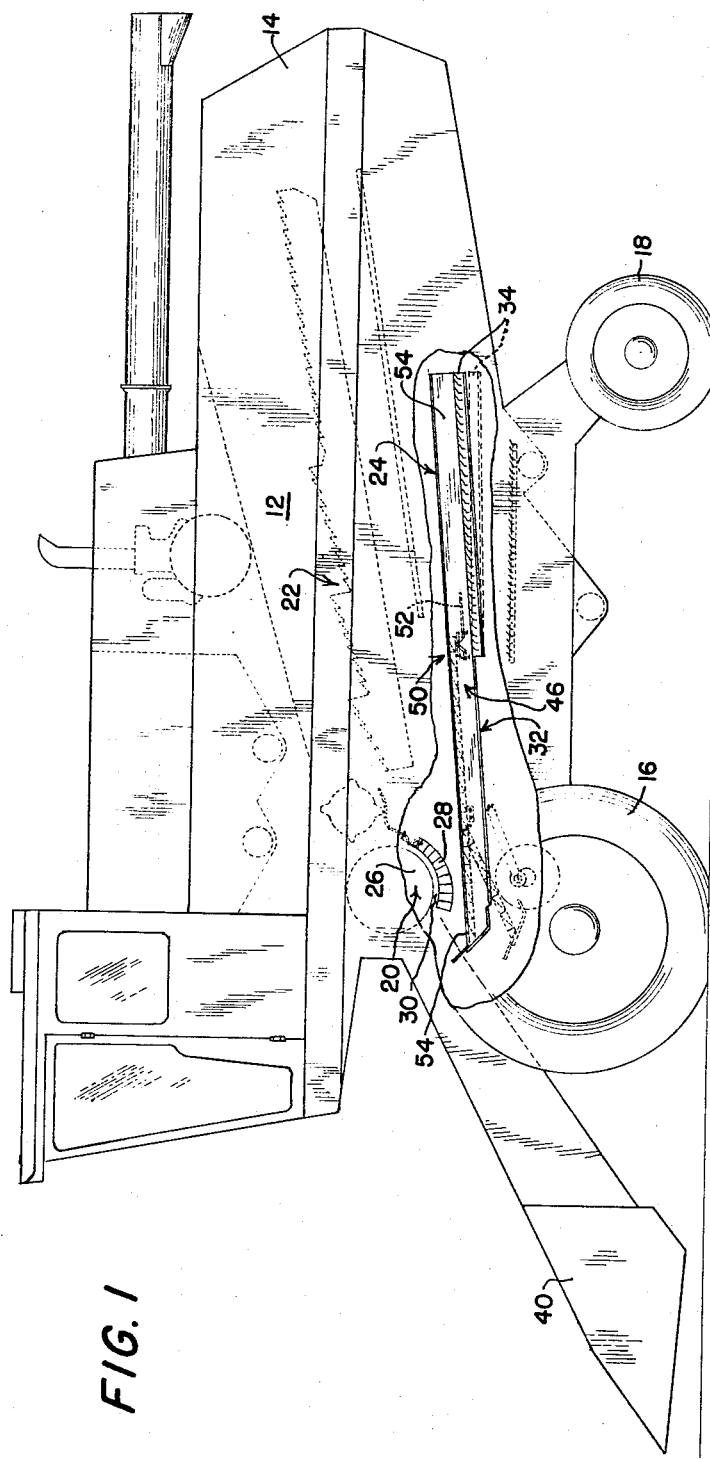
FIG. 1 is a side elevational view largely schematic in its representation, of a combine harvester embodying the present invention.

Referring now to the drawings in detail and in particular to FIG. 1, a combine harvester embodying the present invention is designated in its entirety by the reference numeral 10, the harvester being of more or less conventional construction except for the provision of the novel chaffer sieve support of the present invention. The harvester involves in its general organization a chassis or body portion 12 having vertical side walls 14, the body portion being tractionally supported by drive wheels 16 and steerable wheels 18. The body portion 12 serves to enclose the grain-threshing mechanism 20, the separating mechanism 22 and the cleaning mechanism 24, the latter mechanism embodying the chaffer sieve support of the present invention as will be described in detail subsequently.

The grain-threshing mechanism 20 includes a threshing drum 26 mounted for rotation about a transverse axis of the harvester and cooperates with a concave 28 in the usual manner to define a threshing zone 30 therebetween. A grain pan assembly 32 is disposed below the concave 28 and functions to collect the grain which passes through the concave and convey it rearwardly toward the cleaning mechanism 24. This cleaning mechanism embodies the aforementioned grain pan assembly 32, and also a chaffer sieve 34 which is supported from the grain pan assembly by a novel sieve-supporting structure which constitutes the principal feature of the present invention and which will be described in detail presently. Material such as straw or the like which does not pass through the concave 28 is discharged by the threshing drum 20 to the separating mechanism 22 which removes any remaining grain and deposits the same on the cleaning mechanism, while at the same time discharging the remaining straw to the ground out of the rear of the harvester.

The harvester 10 is fed with unthreshed material which is collected by the crop supply platform 40. This material travels upwardly and rearwardly through the feeder 42 under the influence of an internal conveyor (not shown), the conveyor discharging its contents rearwardly over the rear edge of the feeder and into the threshing zone 30.

The general arrangement of parts thus far described is purely conventional and no claim is made herein to any novelty associated with the same, the novelty of the present invention residing rather in the chaffer sieve and its associated supporting structure by means of which it is releasably secured in position in suspended relationship with respect to the grain pan assembly 32 and which securing means will be fully described hereinafter and subsequently claimed.

Referring now additionally to FIGS. 2, 3 and 4, the grain pan assembly likewise is more or less conventional in its construction except insofar as it is modified to accommodate the chaffer sieve supporting structure of the present invention. Briefly, the grain pan assembly is of shallow tray-like configuration and includes a grain pan proper or pan bottom 44 which is supported between a pair of longitudinally extending side rails 46. The grain pan further includes a forward upstanding transverse member 48. An inverted finger-supporting channel 50 extends transversely across the rear open edge of the tray-like structure and carries the usual series of rearwardly extending grain pan fingers 52. tThe side rails 46 extend rearwardly beyond the grain pan bottom 44 as indicated at 54 and these extensions cooperate in a novel manner with the chaffer sieve 34 not only to removably support the same in its operative position within the harvester but also to seal the side margins of the sieve against travel of grain therealong or thereacross and thus maintain the effective perforated area of the sieve in the path of grain flow to the exclusion of such side margins, all in a manner that will be made clear presently. The grain pan is further provided with conventional pan dividers, grain baffles and other well known instrumentalities which bear no direct relationship to the present invention and which therefore require no description herein, it being sufficient to designate all such instrumentalities collectively by the reference numeral 55.

Still referring to FIGS. 2, 3 and 4, according to the present invention the chaffer sieve 34 embodies the usual rectangular perforate dual sieve proper 56 which is affixed in a marginal reinforcing frame consisting of longitudinally extending marginal frame members 60 and front and rear transverse frame members 62 and 64 respectively. These frame members are each in the form of outwardly presented channels. Conventional trapezoidal sieve divider plates 65 are carried on longitudinally extending divider support strips 66 and extend in spaced parallelism longitudinally along the sieve proper 56.

The grain pan bottom 44 extends between the two side rails, is affixed thereto, and lies generally in the median horizontal plane of such side rails. The chaffer sieve 34 is disposed immediately rearwardly of the grain pan bottom and slightly below the level thereof where it may receive the grain which is discharged from the latter. In its operative position, the chaffer sieve bridges the distance between the side rail extensions 54 and is supported on a pair of angle pieces 70 by means of which the sieve is clamped upwardly against the lower side edges of the rail extensions 54, and more particularly against a pair of lateral edge flanges 72 which are formed on such lower side edges and which extend coextensively along the grain pan side rails 46 as clearly shown in FIGS. 2, 2a and 9.

The angle pieces 70 are pivoted adjacent their forward ends to the side rails 46 of the grain pan at regions close to the rear discharge edge of the grain pan bottom 44 and they are capable of swinging movement about a horizontal transverse axis between the raised and substantially horizontal sieve-clamping position in which they are illustrated in FIGS. 2 and 2a, and the lowered inclined position of sieve-release in which they are shown in FIGS. 3 and 5. The angle pieces 70 can also be pivoted about a vertical axis, defined generally by bolts 80, which facilitates relative movement between the angle pieces 70 and the chaffer sieve 34. Accordingly, the forward end region of each angle piece 70 is floatingly supported by a rigid suspension pivot assembly 74, the details of which are best shown in FIGS. 5 and 6, while the rear end of such angle piece is adapted to be releasably clamped by a suspension clamp assembly 76 (FIGS. 2, 7, 8 and 9) against the underneath side of the adjacent side frame member 60 of the chaffer sieve so as to draw the entire frame member upwardly and clamp the same hard against the lateral flange 72 of the grain pan side rail 46.

The suspension pivot assembly 74 embodies a bolt 80 (FIGS. 5 and 6) which passes loosely through a hole 82 in the lateral side rail flange 72 and also through an oversize hole 84 in the horizontal flange 86 of the angle piece 70. A spacer sleeve 87 encompasses the shank portion of the bolt 80 above the flange 86 and a clamping nut 88 and washer 90 is threadedly received on the lower end of the bolt 80 and serves to draw the flange 86 upwardly against the underneath side of the angle piece flange 86. The assembly which includes the bolt 80, spacer sleeve 87, nut 88 and washer 90 is a permanent one and constitutes a rigid supporting structure for the forward end of the angle piece 70, such angle piece being supported directly on the washer 90 and being drawn upwardly against the flange 72 by the nut 88. The diameter of the hole 84 in the horizontal flange 86 of the angle piece 70 is greater than the outside diameter of the spacer sleeve 87 so that when the rear end of the angle piece 70 is released by the suspension clamp assembly 76, the forward end of the angle piece will rock on the washer as shown in FIG. 5 and allow the angle piece 70 to assume the inclined position of chaffer sieve release in which it is shown in FIGS. 3 and 4. Such rocking movement of the angle piece 70 is made possible by reason of the fact that the vertical flange 91 of the angle piece 70 lies outside of the lateral span of the flange 72 on the grain pan side rail 46 so that the parts will not bind when the angle piece 70 is moved to its inclined position.

The details of the aforementioned suspension clamp assembly 76 are illustrated in FIGS. 7, 8 and 9, the assembly including a spacer sleeve 92, a bolt 98, and a cooperating nut 100. The shank portion of the bolt 98 passes through a hole 102 in the lateral flange 72 of the grain pan side rail 46, projects through the spacer sleeve 92 and passes through a hole 104 in the horizontal flange 86 of the angle piece 70. Thus, when the nut 100 is tightened against the angle piece 70, the rear end of the latter is securely clamped in the raised position in which it is illustrated in FIGS. 2, 7 and 9. A bolt and nut 118 is used to secure the sieve to the angle pieces 70.

In order to release the rear end of the angle piece 70, the suspension clamp assembly 76 may be disassembled by removing the nut 100 and lowering the angle piece so that it assumes the inclined position in which it is shown in FIG. 8. The spacer sleeve 92 may then be removed while the bolt 98 may remain in place. The bolt and nut 118 are then removed, thus permitting angle pieces 70 to pivot about both a horizontal and vertical axis. The lowermost position of the angle piece 70 is determined by the provision of front and rear supporting hangers or bridles 106 and 108 each of which is of wide U-shape configuration and the ends of which are bolted or otherwise secured to the grain pan side rails. As an alternate for the hangers 106 and 108 projections could be provided on the inner surfaces of the combine side walls 14 to serve the same function.

From the above description it will be apparent that when it is desired to partially withdraw the chaffer sieve from its operative clamped position within the framework of the grain pan 32 for inspection or superficial cleaning thereof, no attention need be given the two forward suspension pivot assemblies 74 (FIGS. 2, 5 and 6) it being necessary merely to partially disassemble the rear suspension clamp assemblies 76 and nuts and bolts 118 in the manner previously described to thus release the angle pieces 70, after which they may be lowered into contact with the suspension hangers or bridles 106 and 108 so that they will assume the inclined position wherein they are shown in FIG. 3. Since the chaffer sieve 34 is supported by the angle pieces 70, the sieve will also become lowered and then, since the horizontal or lower flanges 86 of such angle pieces constitute, in effect, ramp portions on which the chaffer sieve 34 may be slid longitudinally, the sieve may be pulled rearwardly to any desired extent, for example to the intermediate position in which it is shown in FIG. 4 wherein the sieve remains supported on the angle pieces 70 for convenient inspection or superficial cleaning thereof. If it is desired to perform a thorough cleaning operation on the chaffer sieve 34, to effect extensive repair thereof, or to effect chaffer sieve substitution, the chaffer sieve may be slid completely from the confines of the two angle pieces 70. Replacement of the chaffer sieve 34 may be effected by a reversal of the removal operation.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a combine harvesting machine having a cleaning area for threshold crop material, in combination, a grain pan assembly disposed in said cleaning area for receiving the threshed material, said grain pan assembly embodying a generally horizontal pan bottom having a rear discharge edge and a pair of upstanding marginal pansupporting side rails, a chaffer sieve disposed in said cleaning area, a chaffer sieve support pivotally connected at its forward end to said side rails in the vicinity of said discharge edge of the grain pan for swinging movement about a horizontal axis between a raised generally horizontal position wherein the chaffer sieve is disposed in substantially edge-to-edge grain-receiving relation relative to said grain pan bottom, and a lowered inclined position where it is accessible for cleaning and inspection purposes, and means for releasably locking said sieve support in its raised position.

2. In a harvesting machine, the combination set forth in claim 1, wherein said chaffer sieve support comprises a pair of angle pieces pivoted at their forward proximate ends to said side rails and presenting inwardly directed sieve-supporting flanges on which the side margins of the chaffer sieve are supported in coextensive relationship.

3. In a harvesting machine, the combination set forth in claim 1 wherein said pan-supporting side rails are formed with rearward extensions which project beyond the discharge end of the pan bottom, and said sieve support serves when in its raised position, to clamp the side margins of the chaffer sieve against the underneath edges of said side rail extensions.

4. In a harvesting machine, the combination set forth in claim 2, wherein said pan-supporting side rails are formed with rearward extensions which project beyond the discharge edge of the pan bottom, and said sieve-supporing flanges of the angle pieces serve to clamp the side margins of the chaffer sieve against the underneath edges of said side rail extensions when the chaffer sieve support is in its raised position.

5. In a harvesting machine, the combination set forth in claim 4, wherein the lower edges of said pansupporting side rails are provided with outwardly directed lateral edge flanges which, in combination with the associated angle pieces of the chaffer sieve support, define inwardly directed opposed sieve-receiving channels within which the side margins of the chaffer sieve are confined when the support is in its raised position.

6. In a harvesting machine, the combination set forth in claim 5, wherein the side margins of said chaffer sieve are slidable on the sieve-supporting flanges of said angle pieces whereby the chaffer sieve is longitudinally shiftable bodily in said support for endwise removal therefrom when the latter is in its lowered position.

7. In a harvesting machine, the combination set forth in claim 6 including, additionally, a sieve-supporting suspension bridle secured to said side rail extensions and having portions thereof underlying said angle pieces for limiting the extent of downward swinging movement of the side rails.

8. In a harvesting machine, the combination set forth in claim 6, wherein spacer sleeves are interposed between said edge flanges and the associated angle pieces, bolts project through the edge flanges, spacers and angle pieces, and clamping nuts are threadedly received on the bolts and serve to clamp the angle pieces and edge flanges to the spacer sleeves.

9. The invention as set forth in claim 1 wherein the pivot connection at the forward end of said chopper sieve support to said side rails also permits pivoting about a generally vertical axis.

10. The invention as set forth in claim 2 wherein the pivot connection between the forward proximate ends of said angle pieces and said side rails permits pivoting about vertical axes as well as about a horizontal axis.

* * * * *